United States Patent Office 3,093,281
Patented June 11, 1963

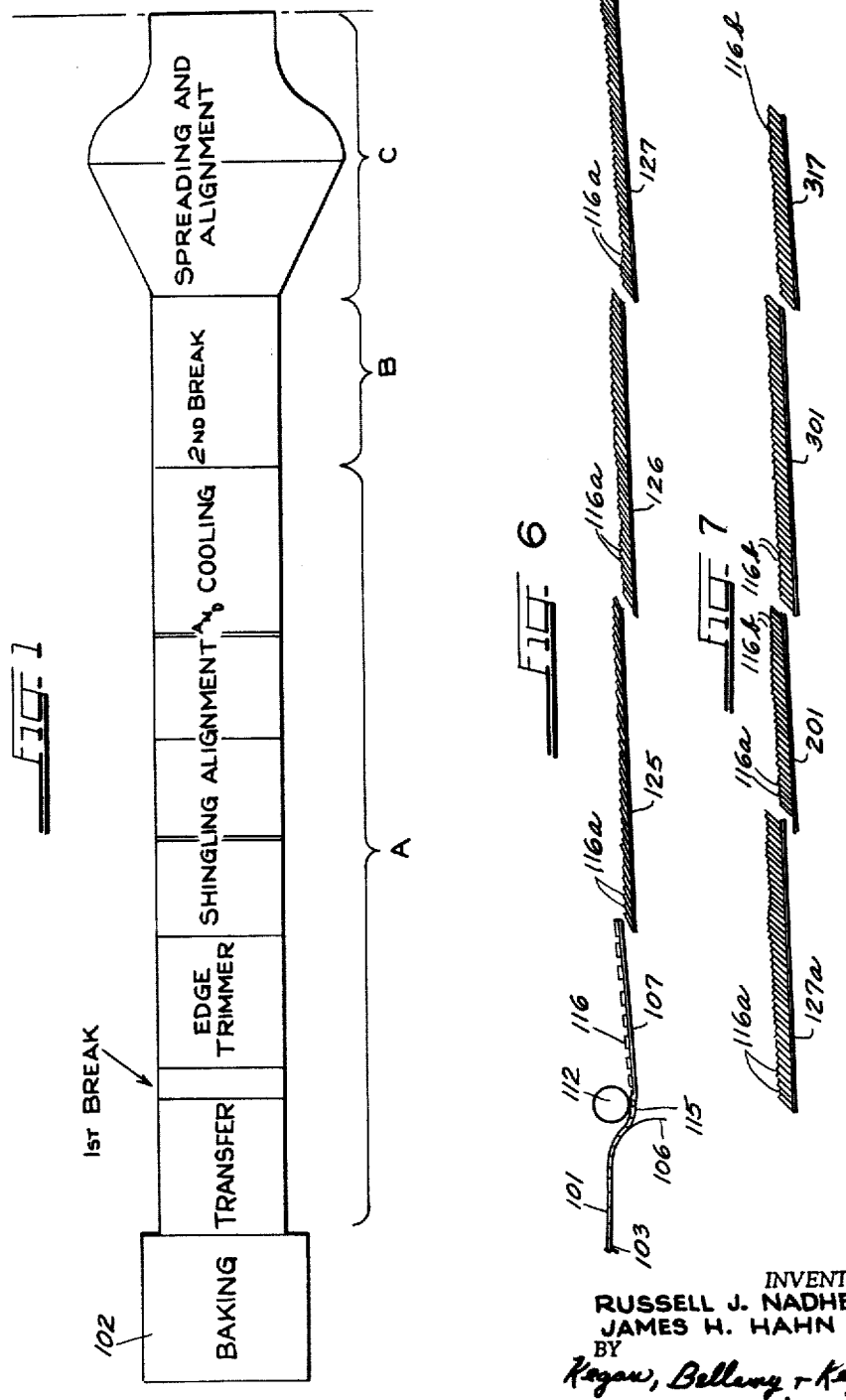

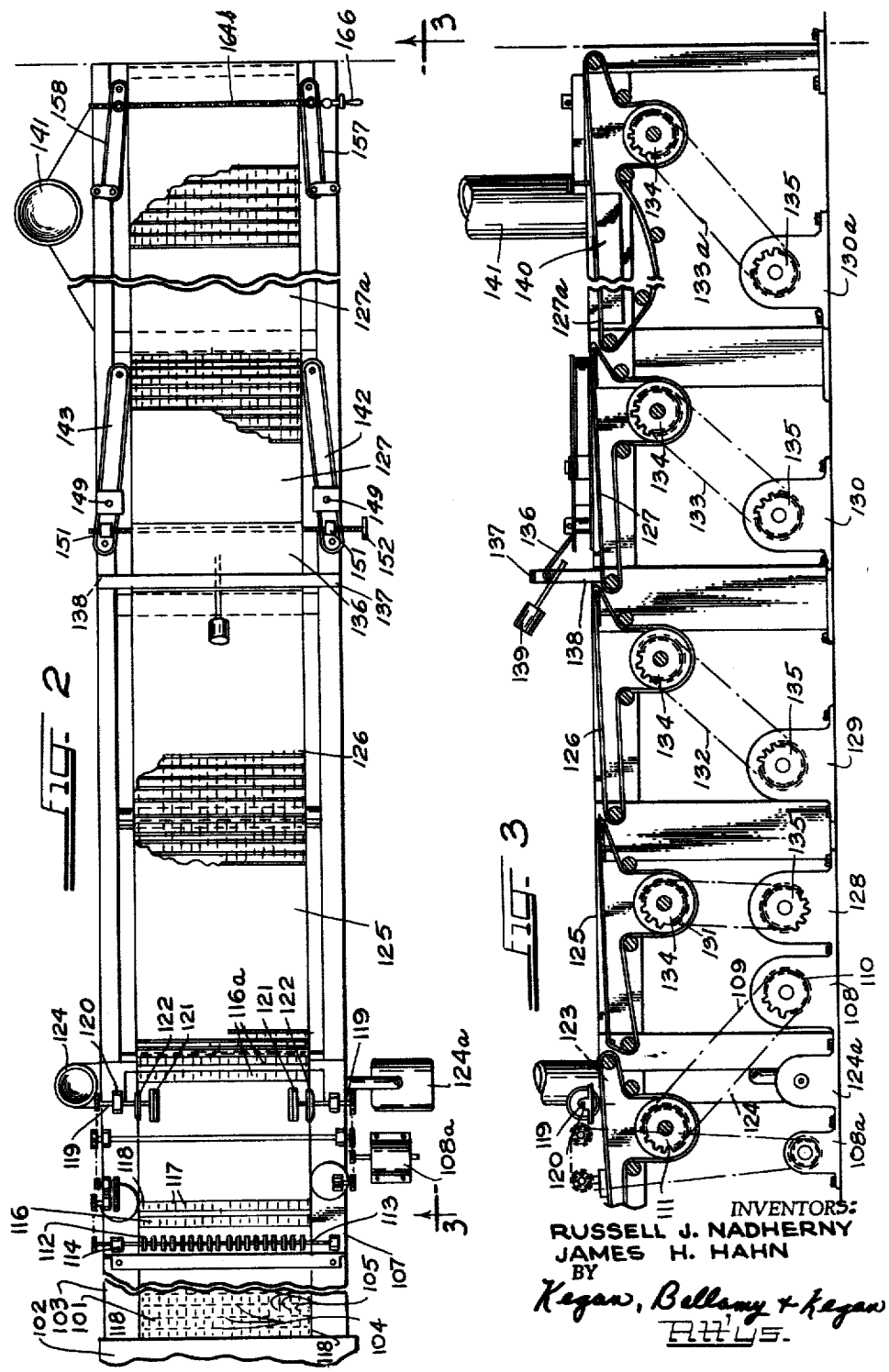

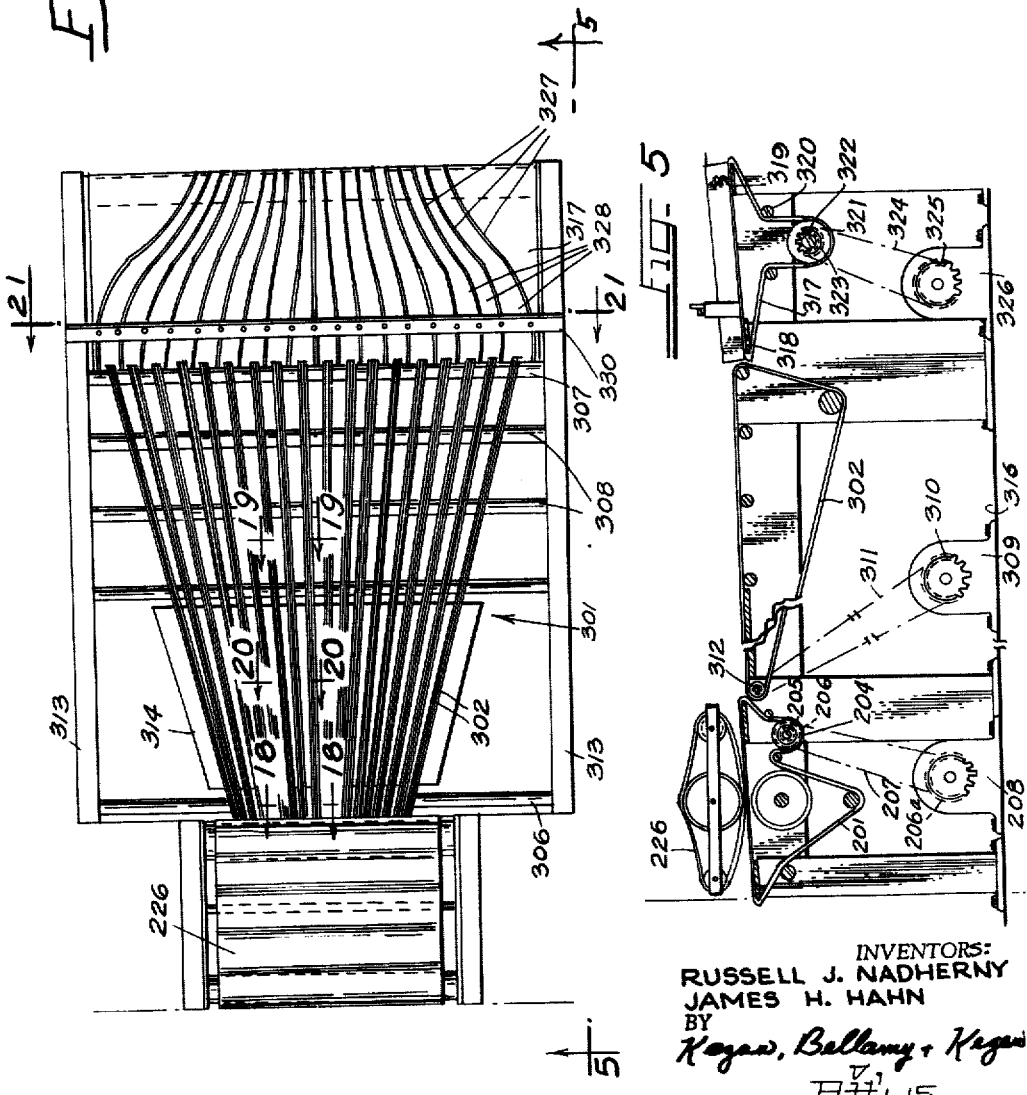

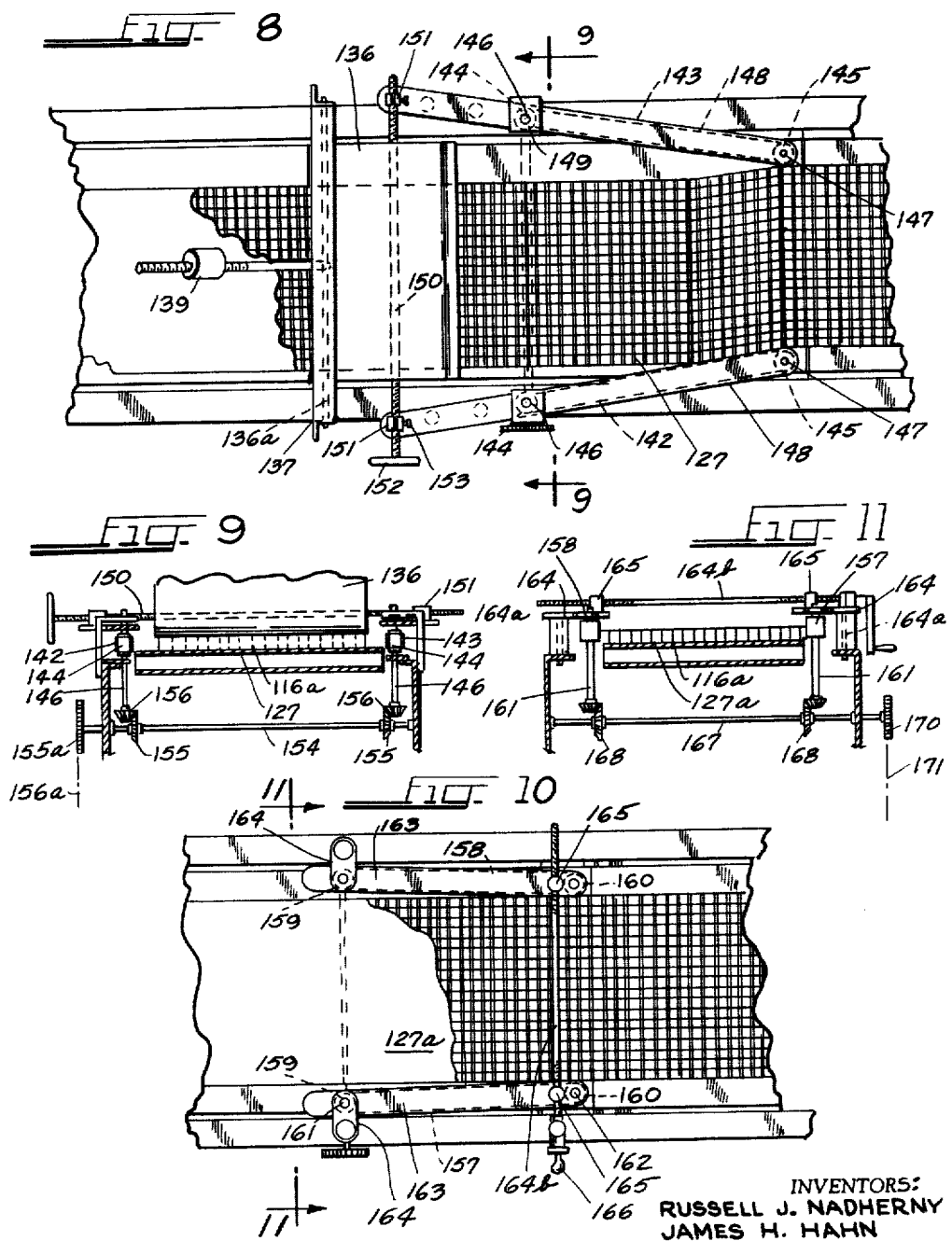

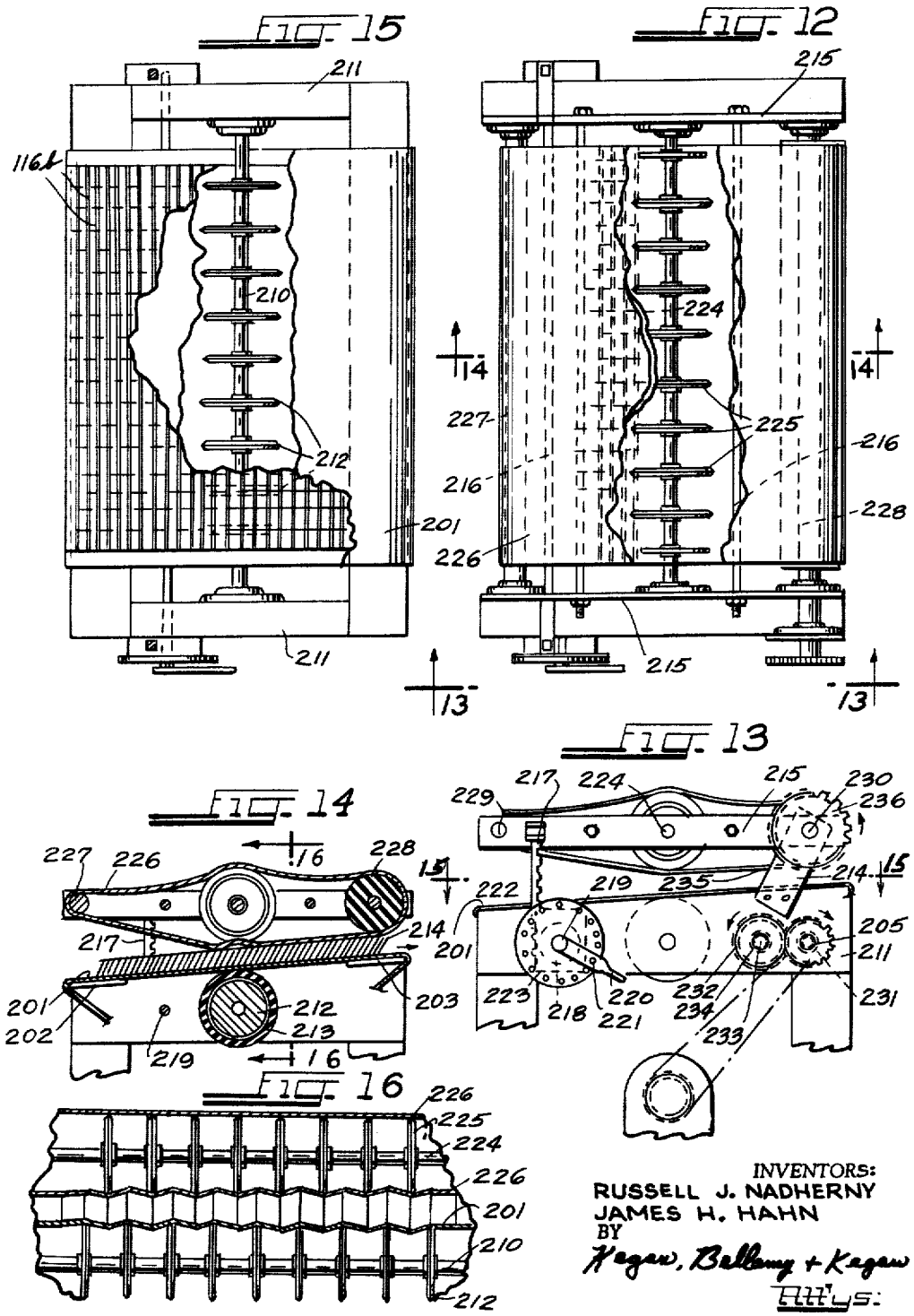

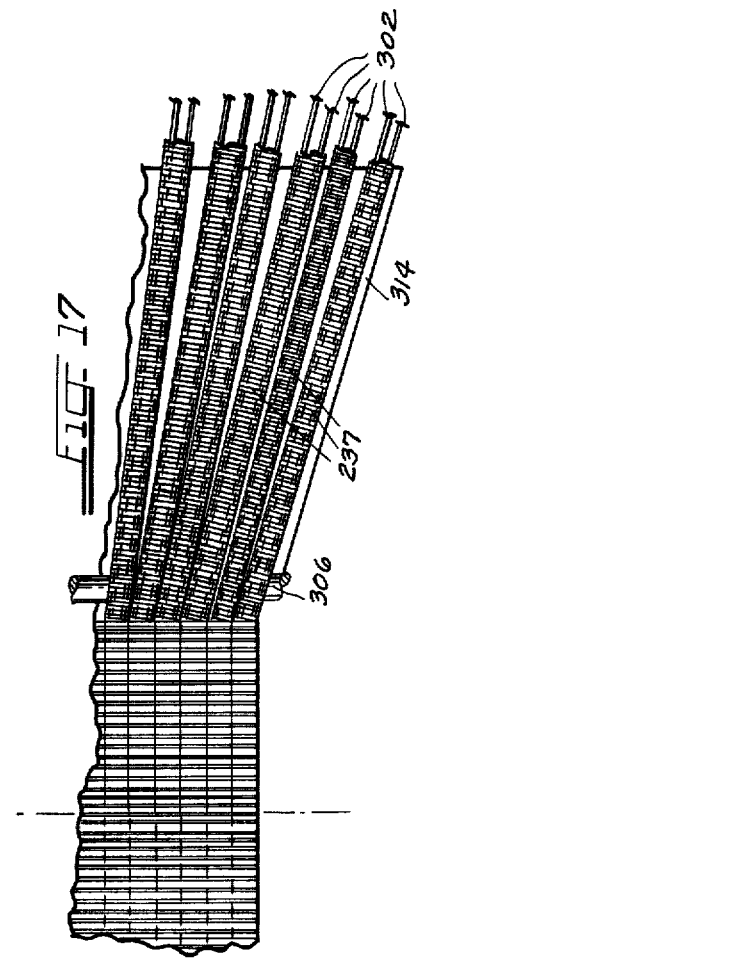

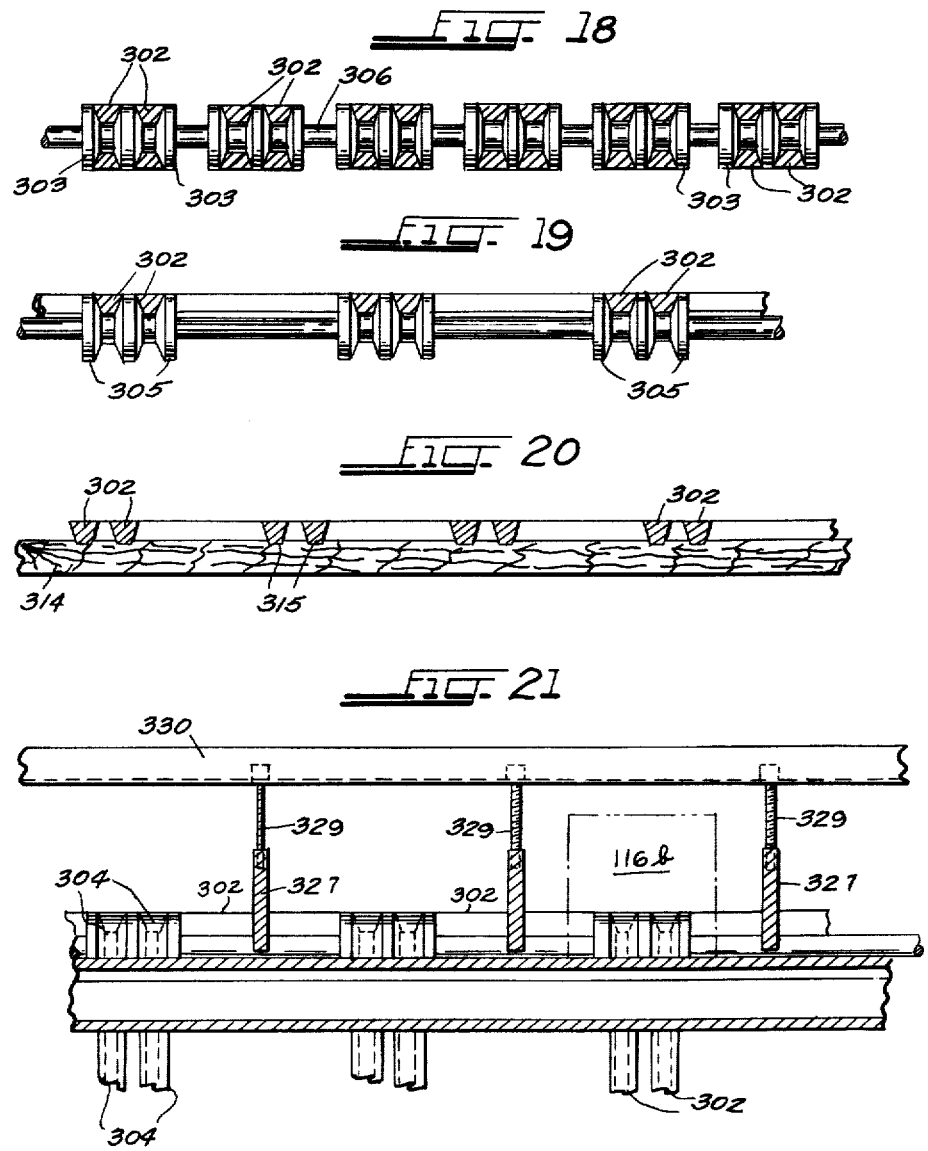

3,093,281
APPARATUS FOR HANDLING BAKERY ARTICLES
James H. Hahn, Glenview, and Russell J. Nadherny, Wilmette, Ill., assignors to Schulze and Burch Biscuit Co., Chicago, Ill., a corporation of Illinois
Original application Aug. 23, 1957, Ser. No. 679,991. Divided and this application Aug. 29, 1960, Ser. No. 52,637
9 Claims. (Cl. 225—97)

This is a division of the present inventors' application Serial No. 679,991, filed August 23, 1957, now abandoned.

This invention relates to a portion of a self-contained and fully automatic system for performing on bakery products all operations required between the baking oven and wrapping apparatus. The invention is particularly adapted for use on crackers baked in a continuous line baking oven and issued therefrom as continuous scored sheets, or a series of platoon-like sections. The sheets and platoons include long strips moved broadside ahead and divided into cracker panels or divisions by means of the scoring. The herein described apparatus performs the operations of breaking the platoons and sheets into strips of the desired unit width, conveying and shingling the strips, breaking the strips into the desired unit size, and aligning each of the plurality of rows of units so formed.

Frangible bakery products are produced from sheets of dough suitably embossed or scored, and which occupy the greater part of the width of an endless band conveyor traveling through an oven of the continuous discharge type. In its direction of travel the scored sheet may be continuous, it may be fed into the oven as a series of spaced platoon-like sections, or it may issue from the oven as a series of spaced sheet sections of variable length as a result of the lengthwise shrinkage occurring in the sheet during baking.

The baked product initially is cooled during its travel from the oven and then is broken into the desired unit size for packaging. That is, it may be broken into units comprising, for example, one, two or four cracker panels. The breaking operation may be accomplished mechanically, in which case the product, more often than not, is subjected to forces which cause a great deal of crumbling and waste; or, the breaking may be done entirely by hand. The latter, of course, has proved far too slow and expensive, besides being contrary to desired sanitary practices.

Thus, it is desirable to provide an automatic system which breaks large quantities of crackers in a rapid and highly efficient manner.

In addition, the system must be completely accurate and capable of handling the crackers without causing appreciable breakage and waste, since the oven-fresh crackers when cooled will be very brittle, and hence not able to withstand rough handling.

The present invention provides an automatic system which meets and fulfills all these requirements, while operating for the intended purpose in a highly satisfactory and efficient manner. The system further may be used with other bakery products, such as graham crackers, Ry-Krisp, cookies, etc., as well as also being capable of handling widely different types of articles, such as floor tiles, shingles, and candy bars. In view of the immediate commercial demand therefor, however, the embodiments of the present invention herein disclosed are particularly adapted for handling soda crackers.

A primary object of the invention is the provision of automatic means for receiving the bulk crackers in baked sheets of joined crackers, and thereafter separating the bulk into cracker panels of the desired unit size for wrapping or packaging without causing any appreciable cracker wastage or breakage.

A specific object of the invention is to provide a novel automatic assembly capable of continuously separating scored cracker sheets or sections to desired cracker panel sizes, and maintaining and discharging the same in aligned arrangement for subsequent handling operations while keeping cracker waste at a minimum.

Other objects of this invention are to provide cracker handling apparatus: which operates in a highly automatic, efficient and rapid manner and is capable of handling crackers produced under the most rapid of modern mass production methods; which gently handles the crackers without subjecting them to any undue forces, without breaking the blishters normally resulting in baking, or without scraping off the salt which may have been applied; and which marshals the crackers into desired dressed alignment to facilitate the several automatic handling operations, as well as facilitating cracker transfer therebetween.

The foregoing and other objects are fully met by a system capable of receiving the crackers issued from an oven in large, flat embossed sheets. Standardized equipment is used up to the point of oven discharge. The crackers next are carried by a continuous belt conveyor to transverse break equipment which separates the crackers into strips of the desired size. In the herein embodiment, the sheet is broken into strips a single cracker panel deep, although, of course, strips two or more panels deep may be provided. The strips further move broadside ahead and comprise a plurality of crackers. For the purpose of the herein description, the strips, for example, may be eighteen crackers wide. This first breaker station includes a plurality of wheels commonly mounted to a rotating shaft, and positioned above the moving sheet of crackers so as to ride thereon. As the wheels ride on the moving sheets they cause breaks at the transverse scored lines, thereby separating the crackers into strips eighteen crackers wide. From the first breaker station the cracker strips move past a trimmer station whereat the brown edges at either end of the strips are removed. After the crackers leave the trimmer station, they pass onto a series of successively slower moving conveyors which causes the cracker strips to become shingled. Means further may be provided to facilitate cooling of the crackers as they are shingled. At the last of the shingling conveyors auxiliary alignment conveyors are provided at each side thereof for directing the feed of the shingled strips of crackers to the next breaker station.

At the second breaker station the strips of eighteen crackers each are broken into cracker units of the size desired to be wrapped. For example, as hereinafter illustrated, the strips are broken into units comprising single cracker panels. Large rubber wheels are alternately arranged above and below the conveyor carrying the crackers through the breaker station, the wheels being aligned with scored lines in the cracker strips. The purpose of the auxiliary conveyors, hereinabove mentioned, is to feed the shingled strips of crackers to the breaker wheels so that the cracker strip scored lines are aligned with these wheels. The second breaker station includes an arrangement using canvas belts, one of the belts carrying the crackers thereon, while a second belt travels above the moving crackers and between the crackers and the breaker wheels mounted thereabove. Employment of the canvas belts above and below the crackers as they pass between the breaker wheels maintains the crackers in an orderly manner as they are broken, while preventing undue pressure from being applied to the crackers by the wheels which never touch the crackers.

The individual crackers leaving the second breaker station are then guided into diverging rows to facilitate crumb removal and then aligned for further operations, such as packaging.

The foregoing and other objects, advantages and features of construction will become more apparent upon a consideration of the following description together with the accompanying drawings.

In the drawings:

FIGURE 1 is a diagrammatic plan view of the apparatus comprising the present invention;

FIGURES 2 and 4 taken together constitute a plan view of the entire apparatus, the broken line at the right hand side of FIGURE 2 and the broken line at the left hand side of FIGURE 4 indicating the places where the several parts shown would be joined if the two figures were consolidated into one;

FIGURES 3 and 5 taken together constitute a side elevational view of the entire apparatus, FIGURES 3 and 5 being elevational views of the apparatus shown in FIGURES 2 and 4, respectively;

FIGURES 6 and 7 are consecutive diagrammatic elevational views showing the position of the crackers through the various handling operations;

FIGURE 8 is a plan view of the apparatus at the first of the shingling and cooling conveyors;

FIGURE 9 is a cross-sectional view looking in the direction opposite to cracker travel, taken on line 9—9 in FIGURE 8;

FIGURE 10 is a plan view of the apparatus at the last of the shingling and cooling conveyors;

FIGURE 11 is a cross-sectional view looking in the direction of cracker travel, taken on line 11—11 of FIGURE 10;

FIGURE 12 is a plan view of the apparatus at the second break station, with certain parts broken away for clarity;

FIGURE 13 is an elevational view of the same, taken on line 13—13 in FIGURE 12;

FIGURE 14 is a cross-sectional elevational view taken on line 14—14 in FIGURE 12;

FIGURE 15 is a plan view, with certain parts broken away for clarity, taken on line 15—15 in FIGURE 13;

FIGURE 16 is a cross-sectional view taken on line 16—16 in FIGURE 14, showing the breaking action on the crackers;

FIGURE 17 is an enlarged view of a portion of the apparatus for receiving the crackers from the apparatus shown in FIGURES 12 to 16;

FIGURE 18 is a fragmentary cross-sectional elevational view taken on line 18—18 in FIGURE 4;

FIGURE 19 is an enlarged fragmentary cross-sectional elevation view taken on line 19—19 in FIGURE 4;

FIGURE 20 is an enlarged fragmentary cross-sectional elevation view taken on line 20—20 in FIGURE 4; and FIGURE 21 is an enlarged fragmentary elevation view taken on line 21—21 in FIGURE 4.

General Organization

The herein system is arranged on suitable framing members so as to receive a continuous sheet of crackers 101 (FIG. 2) carried from an oven 102 on an endless band conveyor 103, the cracker sheet 101 having parallel scored lines 104 running perpendicular to the path of sheet travel and parallel scored lines 105 extending parallel with the sheet travel. In practice it has been found that cracker sheet 101 when eighteen crackers wide may be readily handled by the hereinafter described apparatus. Referring to FIG. 1, for convenience and simplicity in understanding the functioning of the apparatus and the nature and advantages of the invention, the portions of the apparatus will be divided into the assemblies as immediately hereinafter designated; Transfer First Break, Trimmer, Shingling Alignment and Cooling Apparatus Station A; Second Break Station B; and Spreading and Alignment Station C.

Transfer, First Break, Trimmer, Shingling Alignment and Cooling Apparatus Station A At the discharge of the oven band 103, the cracker sheet 101 passes over a large roller drum 106 (FIG. 6) and down towards an endless chain conveyor 107 driven at a slightly greater speed than the oven band 103 by a motor 108 (FIGS. 2–3) through a drive chain 109 traveling between sprockets 110 and 111. A series of rollers 112 are commonly mounted on a rotatable shaft 113 extending perpendicular to the direction of travel of conveyor 107 and mounted at each end in bearings 114. The rollers 112 are driven by a motor 108a through a suitable sprocket and chain drive train arrangement, and further are so arranged as to be positioned midway between the scored lines 105. As the cracker sheet 101 is discharged from oven band 103, it passes onto a small slide 115 (FIG. 6) which directs it beneath breaker rollers 112 and onto conveyor 107. The sheet 101, as it passes beneath rollers 112, is bent sharply at the scored lines 104, by the action of rollers 112 thereon, to an extent causing sheet fracture along the scored lines of lesser strength. The sheet thus is divided into a number of strips 116, each a single cracker panel deep and each having eighteen whole interconnected crackers 117.

During the embossing of the cracker sheet 101 a slight small peripheral portion 118 is additionally provided. Experience has shown that the edges of the sheet of dough are baked considerably more intensely than the center portion of the sheet due to edge burning effects, as will be readily understood by those skilled in the baking industry art, so that the edges normally are quite brown. However, the edge or peripheral portion 118 is intentionally scored for removal from the sheet proper so that the brown portions may be discarded readily, leaving the strips of crackers 118 eighteen crackers wide having uniformity of color.

Before the cracker strips 116 are discharged from conveyor 107, their brown edge portions 118 are separated therefrom, for example, by the apparatus shown in FIGURES 2 and 3. More particularly, at each side of conveyor 107 a shaft 119 is provided, the shaft 119 being rotatably mounted thereabove in bearings 120, extending perpendicular to the travel of conveyor 107, and driven by an appropriate takeoff from the drive train from motor 108a. Each shaft 119 carries thereon a retaining wheel 121, made preferably from a soft resilient material, such as sponge rubber, and positioned to ride upon the crackers passing thereunder. Thus, as a strip of crackers rides along on conveyor 107, its end crackers are gripped between the chain belt of the conveyor and retaining wheels 121. Each shaft 119 further is provided with a disk 122 which is so positioned and arranged as to be able to separate the burnt peripheral portions 118 of the cracker strips in a manner of a shearing disk. A hopper 123 is provided below the travel of conveyor 107 so that following the separation of the burnt edges 118 from the strips 116, the edge scraps fall therein. Connected with hopper 123 there is a closed conduit 124 leading to a blower unit 124a which sucks the burnt tailings from hopper 123 and discharges them into a bin (not shown).

The trimmed cracker strips 116a next pass onto a series of shingling and cooling conveyors, each of the chain belt type and having a discharge end at a slightly higher elevation than the elevation of the start of flight of the next succeeding conveyor. The shingling and cooling conveyors include four endless conveyors 125, 126, 127 and 127a, which are driven at successively lower speeds by variable speed motors 128, 129, 130 and 130a, through respective drive chains 131, 132, 133, and 133a, which travel over appropriately arranged sprockets 134 and 135. The difference in speed of the conveyors 125, 126, 127 and 127a causes the strips 116a to overlap and thus become shingled, and the successive shingling action (FIG. 6) raises the strips to successively steeper angles from the horizontal until the strips 116a on conveyor 127a are at an angle of approximately 45° of the horizontal, as shown in FIGURE 7.

A blade 136 pivotally mounted on a shaft 136a attached to a span 137 held on legs 138 extends above and perpendicular to the travel of conveyor 127. Engagement of blade 136 with the strips 116a passing thereunder serves to orient the shingled cracker strips at right angles to conveyor travel. A counterweight 139 is provided for blade 136 so that too much weight is not brought to bear upon the cracker strips 116a. Below the forward flight of conveyor 127a an open top intake duct 140 is provided. By means of a blower (not shown) a continuous cooling draft of air is drawn past the cracker strips 116a through the chain belt of conveyor 127a, into duct 140, and discharged through conduit 141.

Thus, the cooling draft arrangement describes a cooling zone which may be utilized to cool the baked crackers sufficiently for further processing since the cool and brittle dough product is more readily broken. Moreover, where desired, the cooling draft arrangement through the conveyor 127a may act to produce a lowered air pressure on the conveyor side of the shingled strips, thereby inducing the strips to contact the conveyor more firmly while simultaneously cooling them.

At each side of conveyors 127 and 127a auxiliary equipment is provided for properly confining and directing cracker strip flow laterally. This equipment at conveyor 127 (FIGS. 2, 8, 9) includes a pair of endless flat belts 142, 143, each of which continuously travel over wheel drums 144, 145, mounted respectively on vertical shafts 146, 147. The surfaces of belts 142, 143, thus are positioned perpendicular to that of the surface of conveyor 125. Each shaft 147 is rotatably mounted at the forward end of an arm 148 which is pivotally mounted intermediate its ends on a shaft 146 passing therethrough at 149. Adjustment of the positions of the forward ends of belts 142, 143, may be accomplished by means of a screw 150 which threadably passes through blocks 151—151 mounted at the other ends of arms 148. A handle 152 is provided at one end of screw 150 to facilitate turning thereof while set screws 153 are provided at each block 151 to lock the screw in position. As is apparent, turning of screw 150 turns the arms 148 at their respective pivots 149 so that the forward ends of each of the conveyors 142, 143 may be adjusted relative to the flow of the cracker strips 116a on conveyor 125. Drive to the belts 142, 143, is transmitted through a shaft 154 having beveled gears 115 at each end thereof engageably meshing with gears 156 on vertical shafts 146. Shaft 154 at the extreme end thereof carries a sprocket wheel 155a over which travels a sprocket chain 156a suitably driven by motor 130.

The belts 142, 143 converge towards each other in the direction of travel of conveyor 125, and at their forward ends are positioned so as to be contiguous with the edges of the cracker strips 116a passing thereby. As is apparent from an inspection of the drawings, by adjustably turning screw 150, the forward ends of each of the belts 142, 143, may be adjusted relative to the travel of conveyor 125, and thus cracker strip flow thereon may be shifted slightly from one side of the conveyor to the other. The distance between the belts 142, 143, at the forward ends thereof maintains substantially equal to the width of a cracker strip 116a which in the herein described example is eighteen crackers wide. It is to be understood, of course, that the distance between the forward ends of the belts 142, 143, may be adjusted to accommodate any cracker strip width.

Similarly, at conveyor 127a (FIGS. 2, 10, 11) a pair of endless flat belts 157, 158 are positioned at each side of the travel thereof. Each of the belts 157, 158, travels between roller drums 159, 160, respectively keyed to vertical shafts 161, 162. The shafts 161, 162 are pivotally carried by an arm 163 to which there is joined an extension 164 which is pivotally mounted to the frame on a shaft 164a. Adjacent to the forward ends of the arm 163 a screw 164b is provided, the screw 164b threadably passing through blocks 165 on each of the arms 163 and having a handle 166 at one end thereof to facilitate turning. Rotative drive is transmitted to the belts 157, 158, by means of a horizontal shaft 167 carrying beveled gears 168 adjacent each end thereof, which beveled gears mesh with suitable gearing 169 on the vertical shafts 161, 162. At one end thereof shaft 167 carries a sprocket wheel 170 over which a sprocket chain 171 passes, the said chain being suitably driven by motor 130a. As is the case with the apparatus for directing the flow of the cracker strips at conveyor 127, by turning screw 164b the cracker strips may be shifted laterally on conveyor 127a during their travel thereon.

The cracker strips on conveyor 127a thus have been taken from a bulk continuous flat sheet of cracker strips, subjected to transverse breaks forming a flow of independent cracker strips 116, have been trimmed of their burnt edges to provide strips 116a of crackers of uniform size, color and texture, have been shunted to successively slower moving conveyors and thus marshalled into shingled formation, have been cooled, and the shingled cracker strips 116a have been properly oriented for feed to the next successive station. An essential feature of the hereinbefore described apparatus, of course, is that the shingled strips 116a have been properly oriented and prepared for the immediately succeeding operation thereon, which operation breaks the strips into cracker units of the desired size.

*Second Break Station B*

As the shingled cracker strips 116a are discharged from the flight of conveyor 127a, to the second break station at 226 of FIGS. 4 and 5, the crackers in each transverse strip are still connected together. At the second break station, however, the crackers of each transverse strip are broken from adjoining crackers along the scored lines 105.

Referring to FIGURES 4, 5, and 12 to 16, the Second Break Station B includes a lower endless belt conveyor 201 made preferably from a soft, flexible material such as cloth for reasons to become more apparent hereinafter. Conveyor 201 travels at a speed approximating the speed of conveyor 127a, while its start of flight is at a slightly lower elevation than the discharge thereof to facilitate cracker strip transfer. Ledges 202, 203 are provided respectively at the start and discharge of flight of conveyor 201 for the same to pass thereover. Drive is transmitted to conveyor 201 by means of a large roller 204, over which the conveyor belt passes. Roller 204 is keyed to a shaft 205 having a sprocket wheel 206 thereon. A sprocket chain 207 passes between sprocket 206 and a sprocket 206a keyed to the shaft of a drive motor 208. Various idler rollers 209 also are provided to direct conveyor 201 in its flight.

A shaft 210, provided below conveyor 201, intermediate its ends of flight, and extending perpendicular to the travel thereof, is rotatably mounted at its ends in horizontal members 211—211 of the apparatus frame. Mounted for rotation with shaft 210 there is a series of uniformly spaced wheels 212, the rim portion 213 of which are made from a soft, resilient material such as sponge rubber, and shaped to present a fairly pronounced edge which travels against the undersurface of conveyor 201.

A pair of arms 214—214 are pivotally mounted, one to each of the members 211—211, and at their upper ends the arms 214—214 have pivoted thereto generally horizontally extending frame extensions 215—215. Tie rods 216—216 extend between and join the frame extensions 215—215. One frame extension 215 carries a vertical rack 217 which meshes with a pinion 218 mounted on a rotatable shaft 219 at the side of one of the frame members 211. Vertical movement of rack 217 is accomplished by means of a handle 220 fixed to the shaft 219 and carrying a pin 221 insertable in any one of an annular array of holes 222 within a fixed stop plate 223 so as to set the position of rack 217 and consequently that of the frame extensions 215—215.

A shaft 224, rotatably mounted between extensions 215—215 and in a vertical plane passing through wheel shaft 210 carries a second series of uniformly spaced wheels 225 for rotation therewith. Wheels 225 preferably are of the same size, and the same peripheral configuration, and are made of the same materials as are the wheels 212. Further, the wheels 225 are so oriented on their shaft 224 as to be positioned midway between wheels 212 on shaft 210, whereby the wheels 225 are mounted in alternate or staggered relation to wheels 212.

A second endless belt 226 is arranged above conveyor 201 for travel over the wheels 225 and between pulley rolls 227, 228 mounted on shaft 229, 230 at the ends of frame etxensions 215—215. Conveyor 226 preferably is made from the same flexible material as conveyor 201 and is so oriented above as to gently engage the shingled cracker strips 216a as the strips near the wheels 212, 225. The amount of pressure exerted on the strips 116a by the conveyors 201, 226, of course, may be varied by raising or lowering rack 217, and accordingly varying the distance between the opposed surfaces of the conveyors.

Drive for belt 226 is provided by a gear 231 on shaft 205 which gear meshes with another gear 232 fixed to a shaft 233 carrying a sprocket wheel 234. A chain 235 passing between sprocket wheel 234 and a sprocket 236 on shaft 230 completes the drive for the upper belt 226. From the foregoing description and the drawings, it is apparent that the conveyor 201 and belt 226 are arranged for synchronous movement in the same direction and that the shingled strips 116a are gradually gently grasped between the conveyor and belt before the strips 116a pass between the lower and upper wheels 212, 225.

Referring to FIGURE 16, it will be noted that the arrangement of the wheels 212 is such that the weels 212 underlie alternate scored lines 105 of the cracker strips 116a, and that the arrangement and number of wheels 225 is such as to have these wheels overlie the remaining alternate scored cracker lines 105. Therefore, as a cracker strip 116a passes between the series of wheels 212, 225, it is bent sharply at the scored lines 105, the pressure so applied causing fracture at these lines of lesser strength so that the strip is broken into individual cracker panels 116b. While the wheels 212, 225 are illustrated and arranged to break the strips 116a into cracker units comprising individual panels, it is to be understood, of course, that the staggered relation of the wheels 212, 225, may be so arranged that instead of individual crackers being produced from the strips 116a, the strips may be broken into units which comprise other numbers of crackers such as 2, 3 or 4 crackers.

In the herein described example, the cracker sheet 101 is scored to provide 18 crackers in each strip 116a, and the wheels 212, 225, are designed and arranged to separate the 18 crackers in each strip.

Correct feed of the shingled strips 116a to the wheels 212, 225, of course, is essential in order that the scored lines 105 are accurately registered therewith. The direction of feed, therefore, is regulated by the auxiliary conveyors 142—143, 157—158 (FIG. 2), which direct strip flow so as to effect placement of the strips 116a on conveyor 201 with the scored lines 105 aligned accurately with the wheels 212, 225.

It is to be further noted that the cracker strips 116a are in shingled formation and that the initial portion of the path of belt 226 is downward towards conveyor 201 and the strips 116a thereon, so that the strips are gradually engaged by belt 226, subjected to gentle pressure between the belt and conveyor 201 and maintained in formation by the action of the conveyor 201 and belt 226 on the strips as the strips pass the breaker wheels 212, 225, and issue from the breaker wheels in marshaled or aligned formations of rows 237 of individual cracker units 116b.

Being in shingled formation the cracker strips 116a aid in maintaining themselves in an orderly formation while they are subjected to the breaking action of the wheels 212, 225. Moreover, the conveyor 201 and belt 226 further serve to absorb some of the breaking force exerted by the wheels 212, 225, on the cracker strips, thereby lessening the pressure exerted upon the fragile strips while allowing the wheels to flex the strips and cause fracture along the scored lines 105. The material of conveyor 201 and belt 226, of course, being of a soft nature and preferably made from cloth is capable of flexing under the action of the breaker wheels 212, 225.

The cooperable nature of the belts 201, 226, further maintains the separated crackers not only in close formation, but further sets the crackers of each row so that they are properly arranged for pickup at the immediately succeeding station.

The breaker wheels 212, 225 are mounted on their respective shafts 210, 224, so that they are freely rotatable thereon. Actually, it is not necessary to provide drive to the shafts or the wheels, since in some situations, as in the herein example, the wheels may be provided so that each turns loosely on its shaft; or, the wheels may be so mounted as to turn with the respective shafts which may or may not be driven. In the herein described breaker station, rotation of the wheels 212, 225 is accomplished by means of the frictional engagement thereof with their respective belts 201, 226, which pass thereover.

*Spreading and Alignment Station C*

The separated individual cracker units 116b issue from the breaker wheels in parades of 18 rows 237, the crackers of which are shingled and in close formation. It, therefore, is necessary to separate and space the rows into 18 distinct controlled lanes of crackers whereat fixed guides are introduced to facilitate succeeding automatic handling and conveying operations. Further, experience has shown that some waste or tailings always result during the breaking processes. These scraps, of course, must be eliminated from the whole crackers before the same are packaged. These needs are fulfilled at the Spreading and Alignment Station C, the operation of which is so synchronized to the cracker discharge from the breaker station B that the crackers are maintained in the same approximate shingled relation as they were when they left conveyor 201.

Referring to FIGS. 4, 5, and 17 to 21, station C comprises a carrier 301, arranged to receive the crackers 116b from conveyor 201 in close formation, and includes a series of paired endless V-belts 302—302, there being one pair of V-belts for each cracker row 237, or, in the herein illustrated embodiment of the invention, 18 pairs of V-belts 302—302. Each pair of belts 302—302 is strategically arranged with respect to the breaker wheels 212, 225, and is so positioned as to receive thereon the crackers comprising one of the rows 237 which has been discharged from conveyor 201. Each belt 302 travels at substantially the linear speed of conveyor 201 and between pulleys 303—304, respectively, at the start and end of its flight, and further over various idler pulleys 305 positioned intermediate the ends of flight. Pulleys 303 are keyed to a common shaft 306, while pulleys 304 and 305 are rotatably mounted, respectively, on shafts 307 and 308. Drive is supplied to the belts 302 by means of a variable speed motor 309, the shaft of which carries a sprocket 310 over which a chain 311 passes to another sprocket 312 fixed to shaft 306. Shaft 306 is suitably rotatably mounted between horizontal frame members 313—313 while shafts 307 and 308 are also supported by the same.

As seen in FIGURE 4, the V-belts 302 in each pair thereof, travel in spaced parallel paths while the pairs of V-belts 302—302 are arranged to fan out or diverge from each other in the direction of belt travel. Immediately adjacent to the start of flight of the paired V-belts 302—302, a table 314 (FIGS. 4, 17, 20) is provided, the table 314 having a series of paired notches 315—315 in which each pair of V-belts 302—302 travels. Like the V-belts 302, the notches 315 in each pair thereof are arranged in parallel relationship, while the pair of notches 315—315 are divergently directed, or fan out to direct the travel of the V-belts 302—302 therein. Table 314 extends axproximately to the center of flight of the belts 302, after which the belts travel in space. An essential feature of this arrangement is that any scrap which accumulates with the crackers during the preceding operations thereon falls through the space between the belts, and hence is not carried along to subsequent stations. A tray 316 is provided below the belts 302 to catch and collect the falling scraps.

As shown in FIGS. 4, 5, and 21, a flat endless belt conveyor 317 is arranged adjacent the ends of flight of the V-belts 302 to receive the spaced cracker rows 237 therefrom. Conveyor 317 has sufficient width to span the ends of flight of all V-belts 302 and travels at a speed approximating the speed thereof, whereby the crackers 116b retain the same shingled angle as they had on carrier 301. Travel of conveyor 317 is over ledges 318, 319, respectively at its start and end of flight, over idlers 320 and a drive roller 321, keyed to a shaft 322 carrying a sprocket wheel 323 over which a drive chain 324 passes to a sprocket wheel 3255 fixed to the shaft of a variable speed motor 326.

As the shingled cracker rows 237 are discharged onto conveyor 317, each row is separated from rows adjacent thereto by a distance approximating the width of a cracker, while the crackers 116b in each row are in a somewhat irregular arrangement due to the previous handling and conveying operations thereon. Accordingly, means are provided at conveyor 317 for funneling the crackers of the rows into orderly lines, and for positioning the crackers into distinct rows in side by side parallel alignment as the crackers are discharged from conveyor 317. This is accomplished by the introduction of a series of fixed variously shaped guides 327 positioned slightly above conveyor 317 so that the same travels freely thereunder. The cracker rows 237 are discharged onto conveyor 317 between pairs of guides 327 which thus provide controlled lanes 328 wherein the rows 237 travel. As seen in FIGURE 4, the guides 327 are so shaped as to converge the rows 237 towards each other while each lane 328 is of gradually decreasing width and at the end of conveyor flight is of only slightly greater width than the width of the crackers 116b therein, whereby the crackers experience a lateral sliding action as they travel on conveyor 317 and at the discharge thereof are arranged in more orderly rows. The guides 327 are suspended above conveyor 317 by means of screws 329 threadably adjustably attached thereto and suspended from a horizontal member 330 spanning the width of conveyor 317.

Thus the above described apparatus receives an elongated sheet of baked dough, separates it into lateral strips, trims the ends of each strip, shingles the strips, aligns them, breaks them into individual panels, and separates the crumbs.

It is to be distinctly understood that the apparatus shown and described herein is a preferred embodiment which has been given by way of example only, and that various changes and rearrangements of the details shown may be made without departing from the spirit of the invention, the scope of which is defined in the appended claims.

We claim:

1. Apparatus of the character described adapted to transform an elongated sheet of baked dough having a plurality of longitudinal and lateral scores first into rows of shingled individual baked dough strips and then into files of individual panels by conveying said sheet and breaking said conveyed sheet along said lateral scores to form a plurality of laterally extending strips, which comprises in sequential combination along the line of travel of the baked dough being processed:

means for shingling said strips;

means for conveying said shingled strips;

means for engaging each of the conveyed shingled strips along the respective top edges thereof only; and means for breaking the engaged shingled strips along said longitudinal scores thereof.

2. Apparatus as recited in claim 1 wherein the means for conveying said shingled strips comprises a first flexible belt; the engaging means comprises a second flexible belt situated above the first flexible belt; and the breaking means comprises:

a first group of rollers mounted to apply pressure upwardly against the first belt; and a second group of rollers mounted to apply pressure downwardly against the second belt;

each of the first group of rollers being aligned with one of a first group of longitudinal scores, each of the second group of rollers being aligned with one of a second group of longitudinal scores, and each of the said second group of longitudinal scores being disposed between a pair of the said first longitudinal scores.

3. Apparatus as recited in claim 2 and which additionally comprises: means for adjusting the vertical separation between the first and the second belts in order to vary the engaging pressure on the shingled strips.

4. Apparatus as recited in claim 2 which additionally comprises:

conveying means for carrying the shingled strips to the first belt;

a pair of endless belts each located on a respective side of the conveying means for engaging and guiding the ends of the shingled lateral strips;

means mounting each of the endless belts for pivotal movement toward and away from the conveying means; and means for pivoting both of the said endless belts simultaneously.

5. Apparatus for further processing the output of a break station which includes discharge conveyor means for discharging from the break station parallel substantially contacting rows of overlapping shingled panels of freshly baked bakery goods of the class including crackers, where the break station successively receives shingled broadside-advancing strips, each scored along break lines paralleling the direction of advance at similar intervals determinative of panel width and successively breaks the advancing strips along the scored lines into the said rows of panels, the said apparatus comprising:

further conveyor means for receiving, guiding and further advancing each row of shingled panels along a generally horizontal path which diverges from the path of any adjacent row, thereby separating the rows from each other, the said separation of the rows permitting such crumbs as are formed by the said breaking of the strips into panels to be dropped from the panels between the rows, and traveling support means for each row marginally underlying each of the rows which are received, guided, and further advanced by the said further conveyor means, whereby the rows are separated by an open median gap sufficiently wide to permit the pieces of shattered panels to fall therethrough out of the row.

6. Apparatus of the character described adapted to process the output of a bake oven along a given predetermined line of travel for the baked goods output by conveying from the oven, at a given linear speed, a continuous sheet of hot freshly baked bakery goods of the class including crackers, the sheet being frangibly scored along lines longitudinal to the direction of sheet movement, and by repeatedly separating from the sheet in timed relationship to the speed of sheet movement a predetermined length of the front portion of the sheet thereof, thereby transforming the discharged sheet into a continuous series of similar strips, the separating of the sheet into the said strips being effected relatively close to the oven to separate the sheet into the said strips while the sheet is still relatively hot, which comprises in combination means providing a cooling zone, cooling conveyor means operating at a linear speed less than said linear speed of sheet movement for causing the said strips to become shingled, or partly overlapped, in a direction along their said scored lines prior to the entry of the said strips into the cooling zone and to move in shingled formation in such direction through the cooling zone, means for causing the shingled strips to become cooled within the cooling zone, sufficiently for further processing, and break means located beyond said cooling zone, and acting upon the shingled strips in succession to break each of them along each of its said scored lines.

7. Apparatus according to claim 6, wherein the said cooling conveyor means includes a perforate cooling conveyor on which the said shingled strips are carried through the said cooling zone, and wherein the apparatus further comprises means for forcing cooling air to flow through the perforate conveyor and between, and over the surface of, the shingled strips.

8. Apparatus according to claim 7, wherein the said means for forcing cooling air to flow comprises an exhaust duct having its intake underlying the said perforate conveyor and acting through such conveyor to produce a lowered air pressure on the conveyor side of the shingled strips which induces the strips to contact the conveyor more firmly while inducing cooling air to flow between the strips and thence through the conveyor into the said intake.

9. Apparatus according to claim 8, wherein the said cooling conveyor is generally horizontally disposed and the said strips rest thereon and are disposed generally transversely of the direction of conveyor movement and wherein the apparatus further comprises alignment means acting within the said cooling zone upon the strips held to the cooling conveyor by gravity and by the said lowered air pressure on their conveyor side, said alignment means being adapted to cause corrective rotation about a generally vertical axis of such strips as are materially skewed from a right-angled transverse disposition with respect to the direction of conveyor movement, and further being adapted to correctively move transversely of the cooling conveyor such of the strips as may be necessary to bring the said scored lines of any strip into alignment with the respectively corresponding scored lines of the other strips.

References Cited in the file of this patent
UNITED STATES PATENTS

| | | |
|---|---|---|
| 760,417 | Budd | May 24, 1904 |
| 1,351,018 | Blando | Aug. 31, 1920 |
| 1,765,990 | Melville et al. | June 24, 1930 |
| 1,938,110 | Neutelings | Dec. 5, 1933 |
| 2,144,720 | Gibson | Jan. 24, 1939 |
| 2,171,769 | Stolar et al. | Sept. 5, 1939 |
| 2,252,362 | Carus | Aug. 12, 1941 |
| 2,252,363 | Carus | Aug. 12, 1941 |
| 2,261,062 | Huber et al. | Oct. 28, 1941 |
| 2,555,916 | Clark | June 5, 1951 |
| 2,643,523 | Burgess | June 30, 1953 |
| 2,686,543 | Fay et al. | Aug. 17, 1954 |
| 2,925,946 | Graver | Feb. 23, 1960 |

Notice of Adverse Decision in Interference

In Interference No. 94,269 involving Patent No. 3,093,281, J. H. Hahn and R. J. Nadherny, APPARATUS FOR HANDLING BAKERY ARTICLES, final judgment adverse to the patentees was rendered Mar. 2, 1966, as to claims 1, 5, 6 and 7.

[*Official Gazette May 17, 1966.*]